US008931084B1

United States Patent
Paya et al.

(10) Patent No.: US 8,931,084 B1
(45) Date of Patent: Jan. 6, 2015

(54) METHODS AND SYSTEMS FOR SCRIPTING DEFENSE

(75) Inventors: Cem Paya, New York, NY (US); Johann Tomas Sigurdsson, Westmount, CA (US); Sumit Gwalani, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 784 days.

(21) Appl. No.: 12/558,173

(22) Filed: Sep. 11, 2009

Related U.S. Application Data

(60) Provisional application No. 61/096,285, filed on Sep. 11, 2008.

(51) Int. Cl.
*H04L 29/06* (2006.01)
*H04L 29/08* (2006.01)
*G06F 21/12* (2013.01)

(52) U.S. Cl.
CPC .............. *H04L 67/02* (2013.01); *G06F 21/121* (2013.01)
USPC ................... 726/21; 726/22; 726/23; 726/24; 726/30; 713/152; 713/154; 713/160; 713/194; 715/200; 715/234; 380/280

(58) Field of Classification Search
CPC . H04L 67/02; G06F 17/30882; G06F 21/121; G06F 17/218
USPC .......... 713/152, 154, 160, 194; 715/200, 234; 726/21-24, 30; 380/280
See application file for complete search history.

(56) References Cited

U.S. PATENT DOCUMENTS

| | | | | |
|---|---|---|---|---|
| 7,475,235 | B1 * | 1/2009 | Bernardy et al. | 713/1 |
| 7,712,142 | B1 * | 5/2010 | Emigh | 726/26 |
| 2003/0018668 | A1 * | 1/2003 | Britton et al. | 707/513 |
| 2003/0084120 | A1 * | 5/2003 | Egli | 709/218 |
| 2003/0105950 | A1 * | 6/2003 | Hirano et al. | 713/100 |
| 2004/0139327 | A1 * | 7/2004 | Brown et al. | 713/176 |
| 2005/0198692 | A1 * | 9/2005 | Zurko et al. | 726/24 |
| 2007/0107057 | A1 * | 5/2007 | Chander et al. | 726/22 |
| 2008/0301766 | A1 * | 12/2008 | Makino et al. | 726/1 |
| 2009/0019313 | A1 * | 1/2009 | Pokala et al. | 714/37 |
| 2009/0119769 | A1 * | 5/2009 | Ross et al. | 726/13 |
| 2009/0292930 | A1 * | 11/2009 | Marano et al. | 713/189 |
| 2010/0017615 | A1 * | 1/2010 | Boesgaard Sorensen | 713/176 |

OTHER PUBLICATIONS

Hari Gottipati, Hacking Maps with the Google Maps API, Aug. 10, 2005, XML.com, p. 3, downloaded from http://www.xml.com/lpt/a/1607 on Nov. 16, 2013.*
Cook, Steven, "A Web Developer's Guide to Cross-Site Scripting", SANS Institute, Jan. 11, 2003, pp. 1-16.

* cited by examiner

*Primary Examiner* — Chau Le
*Assistant Examiner* — Gary Lavelle
(74) *Attorney, Agent, or Firm* — Fox Rothschild LLP

(57) ABSTRACT

Methods and systems for cross-site scripting (XSS) defense are described herein. An embodiment includes, embedding one or more tags in content at a server to identify executable and non-executable regions in the content and transmitting the content with the tags to a client based on a request from the client. Another embodiment includes receiving content embedded with one or more permission tags from a server, processing the content and the permission tags, and granting permission to a browser to execute executable content in the content based on the permission tags. A method embodiment also includes receiving content embedded with one or more verify tags from a server, performing an integrity check using the verify tags and granting permission to a browser to execute executable content in the content based on the integrity check.

16 Claims, 8 Drawing Sheets

METHODS AND SYSTEMS FOR SCRIPTING DEFENSE

CROSS-REFERENCE TO RELATED APPLICATION

This patent application claims the benefit of U.S. Provisional Patent Application No. 61/096,285, filed Sep. 11, 2008, entitled "Methods and Systems For Scripting Defense," which is incorporated herein by reference in its entirety.

BACKGROUND

1. Field of the Invention

Embodiments of the present invention relate to web browsers, and more particularly to cross-site scripting.

2. Background Art

Cross-site scripting (XSS) is a common type of security vulnerability found in internet content. Cross-site scripting for example, is a class of vulnerabilities in web-applications that allow user input to modify in unintended ways the structure of web pages returned by a server. Typically, this translates to arbitrary code execution in the context of a web browser of the user (e.g. JavaScript execution) at a client used by the user.

In some cases, an attacker exploits a XSS vulnerability to compromise a victim's account or steal a victim's data in different ways. A XSS vulnerability is usually caused when a server receives input from an un-trusted source and incorporates this as part of its output to a different user. Several web applications create their content based on input from their users. User generated content (UGC) could be created any time a web site incorporates input generated by users (blog posts, photos, comments, documents, etc.) as part of its own content. For example, a 'blogging' site allows users to post journal entries. This is an example where content provided by a user is included into content of a content provider for display to other users. Inclusion of user-generated content in such cases may create a XSS security vulnerability.

In order to exploit an XSS vulnerability, a user could send code or other executable content to be executed by another user, by first sending the dangerous content to a content provider (e.g. a 'blogging' site), which may then promptly distribute it to other users without proper safe guards.

The design of Hyper Text Mark-up Language (HTML) is such that web browsers are expected to execute all scripts on a given web page. This requires that any web site employing user-generated content must carefully control every instance such content is distributed to other users. Present methods of XSS defense include server-side measures which disable executable content or 'scrub' or remove executable content from a web page. Disabling executable content is not really an option (that is not an option for the server to instruct a browser to do that given currently available functionality in browsers). Another method is separating content into different domains but this is not possible in all cases and limits user experience.

However, these approaches are error-prone, difficult and fragile because they must be applied without exception to all cases of user-generated content and because the scrubbing requirements may vary based on the context UGC is being incorporated.

Additionally, disabling scripts completely is not viable because scripting is critical for many websites. Additionally, statically examining executable content and scripts (e.g. JavaScript) may not be sufficient because JavaScript allows new code to be dynamically fed to an interpreter using different commands. This means that even if all the script on the page is validated once at page load time, it can still receive un-trusted input and attempt to execute it, thereby exploiting any XSS vulnerabilities.

BRIEF SUMMARY

Embodiments of the present invention relate to methods and systems for cross-site scripting (XSS) defense. Embodiments of the invention may prevent a user from exploiting XSS vulnerabilities by sending executable content to another user that may be potentially malicious. An embodiment includes, embedding one or more tags in content at a server to mark executable and non-executable regions in the content and transmitting the content with the tags to a client based on a request from the client. Another embodiment includes receiving content embedded with one or more permission tags from a server, processing the content and the permission tags, and granting permission to a browser to execute executable content in the content based on the permission tags.

A system embodiment includes a browser to receive content with one or more embedded permission tags from a server, and a script verifier to process the content and the permission tags and to control execution of executable content.

In an embodiment the script verifier comprises a tag identifier to identify one or more permission tags in the content, a key checker to check the value of one or more keys in the permission tags, and an execution permission granter to allow the browser to execute content based on at least the permission tags and the keys. In another embodiment, the script verifier comprises a key identifier to provide or specify one or more secret keys in verify tags, an integrity checker to perform an integrity check on the content using the key, and an execution permission granter to allow the browser to execute content based on at least the integrity check.

Further embodiments, features, and advantages of the invention, as well as the structure and operation of the various embodiments of the invention are described in detail below with reference to accompanying drawings.

BRIEF DESCRIPTION OF THE DRAWINGS

Embodiments of the invention are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION

Figure 1:
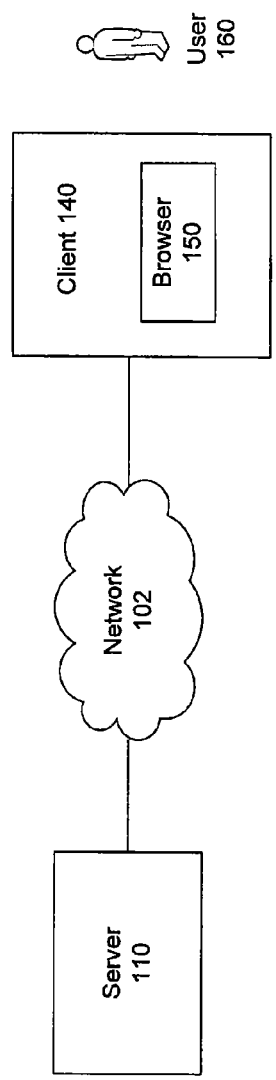
FIG. 1 is diagram illustrating a system for cross-site scripting defense, according to an embodiment.

Embodiments of the present invention relate to methods and systems for cross-site scripting (XSS) defense.

Embodiments of the invention may prevent a user from exploiting XSS vulnerabilities by sending executable content to another user that may be potentially malicious.

An embodiment includes, embedding one or more tags in content at a server to mark executable and non-executable regions in the content and transmitting the content with the tags to a client based on a request from the client. Another embodiment includes receiving content embedded with one or more permission tags from a server, processing the content and the permission tags, and granting permission to a browser to execute executable content in the content based on the permission tags. A method embodiment also includes receiving content embedded with one or more verify tags from a server, performing an integrity check using the verify tags and granting permission to a browser to execute executable content in the content based on the integrity check.

A system embodiment includes a browser to receive content with one or more embedded permission tags from a server, and a script verifier to process the content and the permission tags and to control execution of executable content. (It is to be appreciated that the names associated with tags described herein (such as verify tags or permission tags) are not intended to limit the invention, and any other form of mark-up within a web page or script conveying certain information may be used as or in place of tags. Furthermore, executable content, for example, may include Javascript, VBscript, Flash animations, ActiveX controls, Java applets and constructs used to embed one of these, such as cascading stylesheets (which may further include Javascript). These examples are illustrative and are not intended to limit the invention.)

In an embodiment the script verifier comprises a tag identifier to identify one or more permission tags in the content, a key checker to check the value of one or more keys in the permission tags, and an execution permission granter to allow the browser to execute content based on at least the permission tags and the keys. In another embodiment, the script verifier comprises a key identifier to provide or specify one or more secret keys in verify tags, an integrity checker to perform an integrity check on the content using the key, and an execution permission granter to allow the browser to execute content based on at least the integrity check.

In this way, permission tags are embedded by a server providing web content to delineate sections of the web page that allow or disallow execution of content. Script verifier then uses these permission tags to allow or disallow browser from executing executable content. This helps in preventing XSS vulnerabilities.

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

This detailed description of the embodiments of the present invention is divided into several sections as shown by the following table of contents.

TABLE OF CONTENTS

1. System
2. Using Permission Tags to Filter Executable Content
3. Script Verifier
4. Using Integrity Checks to Filter Executable Content
5. Exemplary Tags and Attributes Used For Integrity Checking
6. Dynamic or 'At Runtime' Integrity Checking
7. Handling XSS Inside JavaScript Blocks
8. Embedding Script Signatures
   8.1. Pre-pending a Signature as an Attribute
   8.2. Embedding a Tag to Cover Executable Content
   8.3. Appending Signatures as Comments
9. Example Computer Embodiment 1. System This section describes a system for cross-site scripting (XSS) defense according to an embodiment of the invention illustrated in FIG. 1. FIG. 1 is a diagram of system 100 for XSS defense. (While the following is described in terms of scripts (e.g. JavaScript, VBScript, Flash, ActiveX), the invention is not limited to this embodiment and any other executable content, script or code, stylesheets, applets, may be used. For example, any system having generally the structure of FIG. 1, or that would benefit from the operation, methods and functions as described herein.)

System 100 includes server 110, network 102 and client 140. Client 140 further includes browser 150. User 160 may communicate with browser 150 through client 140.

Server 110 may be implemented on any server device that can support any web operation. Such a server device can include, but is not limited to, a personal computer, mobile device such as a mobile phone, workstation, embedded system, game console, television, set-top box, or any other computing device that can support web browsing. Such a server device may include, but is not limited to, a device having a processor and memory for executing and storing instructions. Such a server device may include software, firmware, and hardware. Software may include one or more applications and an operating system. Hardware can include, but is not limited to, a processor, memory and graphical user interface display. An optional input device, such as a mouse, may be used. Server 110 may provide or host content that can be retrieved by client 140 over network 102.

In an embodiment, and based on the content being provided by server 110, server 110 may embed the content (e.g. the webpage) with permission tags that specify region of the content that are allowed to execute executable code (e.g. scripts). The operation of permission tags and server 110 is described further below.

Network 102 may include one or more networks, including but not limited to, a local area network, medium-area network, and/or wide-area network, such as, the Internet. Network 102, for example, may be a wired or wireless network that allows client 140 and server 110 to communicate with each other.

Client 140 may be implemented on any client device that can support web browsing. Such a client device can include, but is not limited to, a personal computer, mobile device such as a mobile phone, workstation, embedded system, game console, television, set-top box, or any other computing device that can support web browsing. Such a client device may include, but is not limited to, a device having a processor and memory for executing and storing instructions. Such a client device may include software, firmware, and hardware. Software may include one or more applications and an operating system. Hardware can include, but is not limited to, a processor, memory and graphical user interface display. An optional input device, such as a mouse, may be used.

Client 140 may contact a server 110 and download data to display. In examples, the data may be represented as hypertext markup language, dynamic hypertext markup language, extendable markup language, image data, video, sound. In another example, client 140 may download and execute scripts (e.g. JavaScript) or download an execute scripts embedded within HTML content.

Browser 150 can communicate with server 110 over network 102. Browser 110 can further communicate with an input (not shown) to allow a user to input data, to input commands, or to provide other control information to browser 150. User 160 may communicate with browser 150 using client 140. As an example, user 160 may provide a internet address to browser 150 to retrieve and display content corresponding to the internet address. Browser 150 may then provide a request for content to server 110. Server 110 may respond to the request by providing content back to browser 150 through client 140 over network 102. In an embodiment, and based on the content being provided by server 110, server 110 may embed the content (e.g. the webpage) with permission tags that specify region of the content that are allowed to execute executable code (e.g. scripts). The operation of permission tags and server 110 is described further below.

Figure 2:
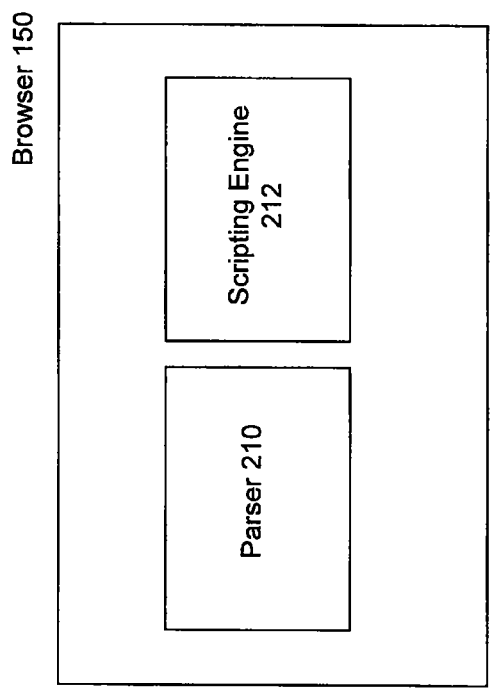
FIG. 2 is a diagram of a browser, according to an embodiment.

FIG. 2 is a diagram illustrating browser 150 in greater detail. As shown in FIG. 2, browser 150 may further include parser 210 and scripting engine 212. In an embodiment, parser 210 may be a HTML parser (or any other language parser) that parses HTML content so that it can be appropriately rendered for display by browser 150. Scripting engine 212 that allows scripts (e.g. JavaScript) retrieved by client 140 to be executed by browser 150.

2. Using Permission Tags to Filter Executable Content

In an embodiment, server 110 may 'mark' sections of content areas (e.g. HTML documents), which are not allowed (or allowed) to include executable content. As an example, server 110 marks portions of content using permission tags, prior to transmitting the content over network 102 to client 140. A permission tag may be any identifier that identifies whether a permission exists.

Example 1 shown below is an exemplary portion of script that is embedded within content (e.g. HTML content) of a web page transmitted by server 110 to client 140.

EXAMPLE 1

<script src="good.js"> . . . (1)
<permission execute="no" key="abc123"> . . . (2)
<script src="bad.js"> . . . (3)
<script> . . . </script> . . . (4)
<a onclick="foo( )"> . . . </a> . . . (5)
<permission execute="yes" key="abc123"> . . . (6)
<script src="good1.js"> . . . (7)

The above exemplary script includes permission tags that are embedded by server 110 within the content prior to transmitting content over network 102 to client 140. Permission tags, for example, may appear any number of times in a document. For example, line (2) includes the permission tag "<permission execute="no" key="abc123">". This permission tag indicates that any script that follows the tag is not to be executed by browser 150. Thus, the script "bad.js" from lines (3) through (5) should not be executed by browser 150. Line (6) includes the tag "<permission execute="yes" key="abc123">" which indicates that any executable content that follows this tag is to be executed by browser 150. Execution is enabled again after line (6) because the key attribute matches the one in line (3). Thus, browser 150 should be permitted to execute script "good1.js". Additionally permission tags may be automatically embedded by server 110 or manually embedded by a user using server 110. As an example, a permission tag may include a key attribute or may appear without a key attribute.

3. Script Verifier

Figure 3A:
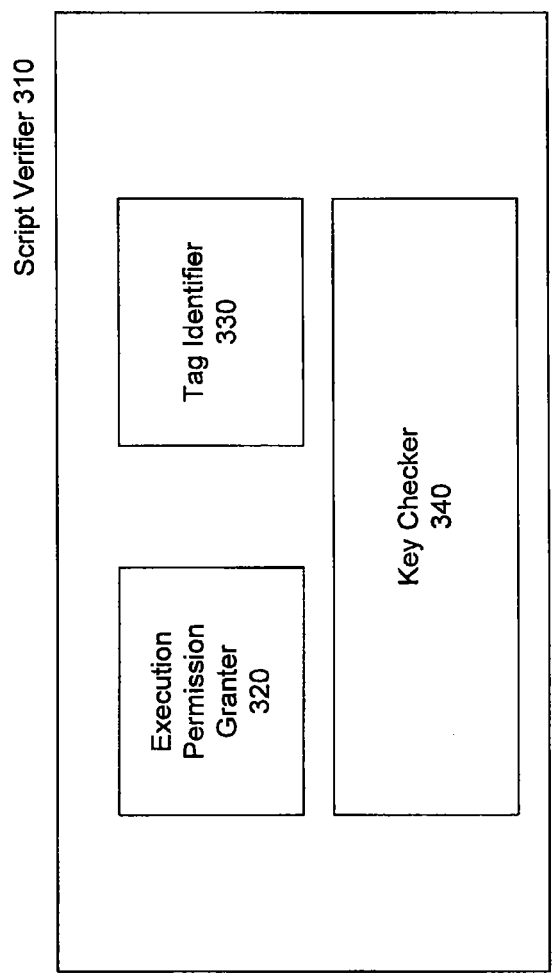
FIG. 3A is a diagram of a script verifier, according to an embodiment.

FIG. 3A illustrates the diagram of script verifier 310, according to an embodiment of the invention. As an example, script verifier 310 may be included in parser 210 or scripting engine 212 or may be included in browser 150 separate from parser 210 and scripting engine 212. In an embodiment, script verifier 310 uses one or more permission tags described earlier, to allow or disallow execution of executable content in browser 150.

As shown in FIG. 3A, script verifier 310 may include execution permission granter 320, tag identifier 330 and key checker 340.

In an embodiment, script verifier 310 processes all executable content that is received by browser 150 from server 110. Such executable content may include different types of scripts written in scripting languages as JavaScript or ActiveX any other scripting language, programming language or a combination of scripting and programming languages. Such executable content, for example, may be embedded within HTML of a web page transmitted by server 110 or could be incorporated by reference, in which case, the HTML points to a location from where executable content would be fetched. Such references could be treated by script verifier 310 exactly as if they were embedded directly. (e.g. allowed only in regions of the document marked executable and stripped/blocked from regions that are marked non-executable)

In an embodiment, when script verifier 310 receives the above section of script illustrated in Example 1, tag identifier 330 identifies permission tags and determines if the permission execute attribute associated with each permission tag is set to "no" or "yes". Depending on the status of the permission execute attribute within the tag, execution permission granter 320 then grants permission to execute content in a section to browser 150. As an example, if execution permission granter 320 does not grant permission execute content, script verifier 310 will ignore and treat the executable content as if that section of the document was not present in content provided by server 110, and browser 150 will not execute the executable content. This permission can apply to a section of the document preceding, between one or more tags or after a tag. In an embodiment, execution permission granter 320 continues to avoid granting permission in a linear manner (i.e. based on the scope of executable or non-executable code that is further based on their syntactic location in the document) until another permission tag is encountered by tag identifier 330 with a permission execute attribute set to "yes".

As shown in Example 1, each permission tag may include an additional "key" attribute. This additional "key" attribute embedded within the tag prevents a malicious user from injecting permission tags of their own choosing. As an example, a key associated with the "key" attribute can be a random value chosen independently by server 110 for each page served to client 140. As an example a key value can be generated by a cryptographic pseudo-random number generator in server 110. In an embodiment, a key value is initialized by the script verifier 310 when it encounters the first permission tag based on the key value embedded within the tag. Any subsequent permission tag is checked by key checker 340 and must be accompanied by the same key value, otherwise the permission tags to enable or disable execution of content will be ignored by script verifier 310 based on an input from key checker 340. In an embodiment, the first instance of the attribute "key" is used by key checker 340. In this embodiment, disabling of executable content may not require a key value. As an example, if a first instance of the tag sets the permission attribute to "no" without a key value, it may indicate that no executable content exists in the rest of the document.

Additionally, according to an embodiment, a value (e.g. "yes" or "no") associated with the permission attribute of the tag is recursively propagated into document object model (DOM) elements on a HTML page served by server 110. If a verified script on the page attempts to insert new executable element into a section of the page marked non-executable (indicating an attempt to exploit XSS vulnerability) the new element will not be accepted by script verifier 310.

For example, DOM may have a hierarchical or tree structure of nodes. In an embodiment, when a non-executable designation is applied to a particular node in the DOM, all other nodes below that would be considered to inherit the designation. Furthermore, for example, if some content attempts to add a new node in that part of the hierarchy and that node happens to contain executable content (for example, it is possible to dynamically insert new script blocks into the DOM) it would be blocked.

In this way, permission tags are embedded by server 110 providing web content to delineate sections of the web page that allow or disallow execution of content. Script verifier 310 then uses these permission tags to allow or disallow browser 150 from executing executable content. This helps in preventing XSS vulnerabilities because user-generated content may be incorporated, for example, in sections marked not-executable using permission tags.

Figure 4:
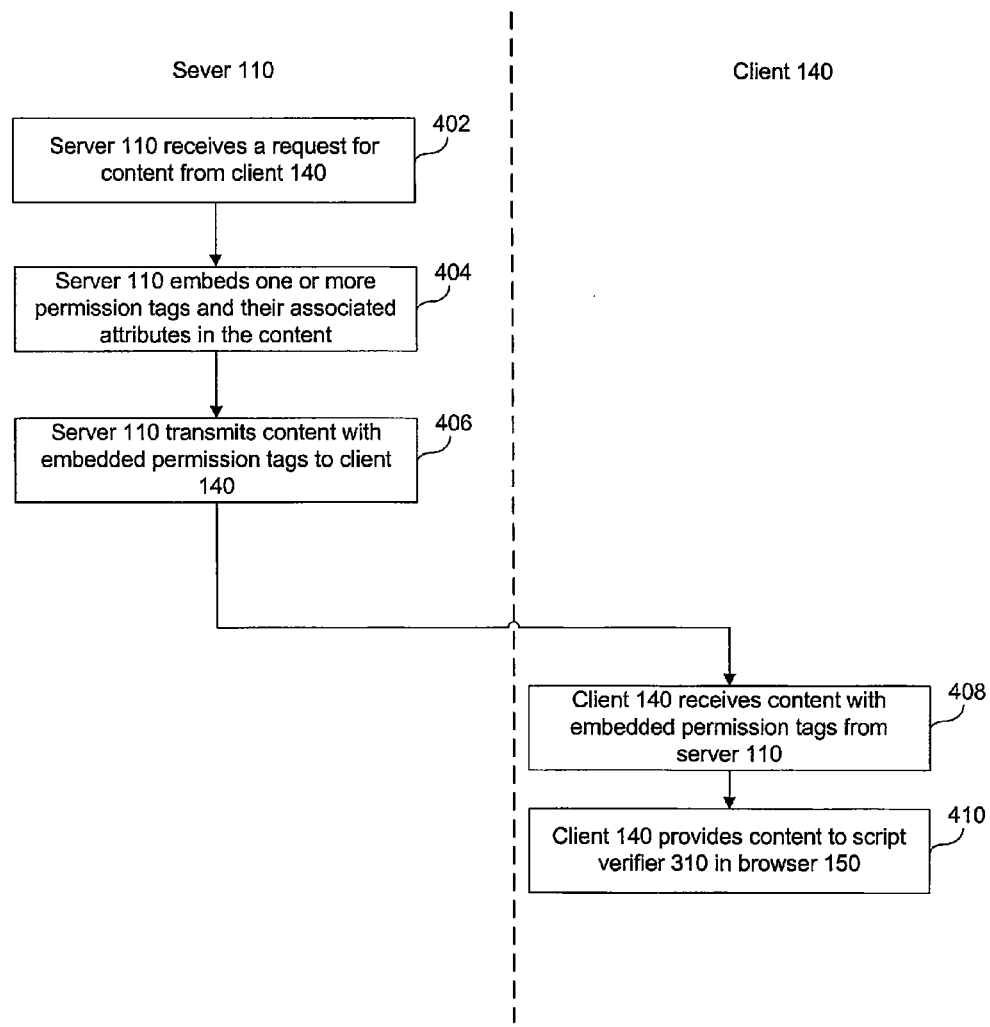
FIG. 4 is a flowchart illustrating an exemplary overall operation of the system described in FIG. 1, according to an embodiment.

FIG. 4 is a flowchart illustrating an exemplary overall interaction between server 110 and client 140 during operation.

Server 110 initially receives a request for content from client 140 (step 402). Server 110 may then embed one or more permission tags and their associated attributes in the content that is requested by client 140 (step 404). As an example, permission tags may be embedded by server 110 prior to any request or at the time of a request i.e. step 404 may occur before step 402. Server 110 then transmits the content with embedded permission tags to client 140 over network 102 (step 406). Client 140 receives the content with embedded permission tags from server 110 (step 408). Client 140 may then provide the content to script verifier 310 in browser 150 (step 410).

Figure 5:
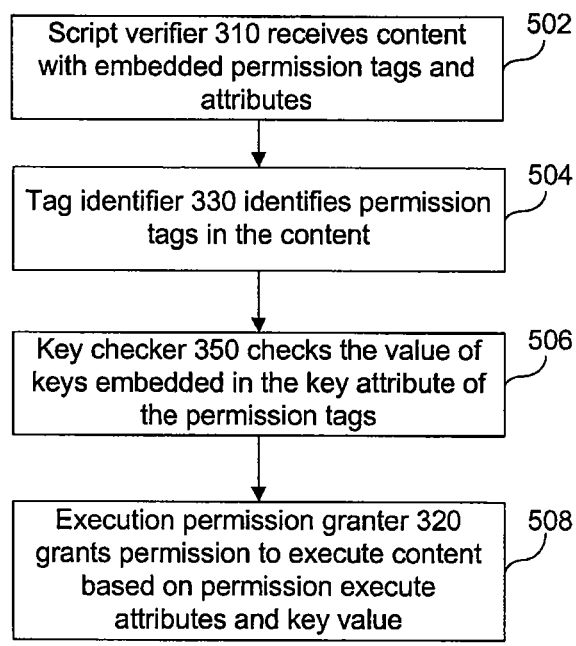
FIG. 5 is a flowchart illustrating an exemplary operation a script verifier, according to an embodiment.

FIG. 5 is a flowchart illustrating an exemplary operation of script verifier 310, according to an embodiment of the invention. Script verifier receives 310 receives content with embedded permission tags and associated attributes (step 502). Tag identifier 330 then identifies permission tags within the content (step 504). Key checker 350 checks the values of the key embedded in the key attribute of the permission tags (step 506). Execution permission granter 320 may then grant permission to execute content based on a permission execute attribute in the permission tag and the key values (step 508).

In an embodiment, browser 150 can turn off functionality associated with permission tags. As an example, an "opt-in" setting at browser 150 would mean that executable content on a web page runs unless it is explicitly forbidden by permission tags, and an "opt-out" setting at browser 150 may indicate that only content explicitly marked inside an enabled section can be executed, and a permission execute attribute of "no" (i.e. do not execute) would signal that all executable content is not to be executed. As an example, such settings (e.g. opt-in or opt-out) can be configured on a per-URL or identifier basis.

In an embodiment, not intended to limit the invention, script verifier 310 can be implemented as a Multi-Purpose Internet Mail Extensions (MIME) filter for browser 150. In another embodiment, script verifier 310 may be a stand-alone dynamic link library (DLL) for a text/html MIME type. This would allow all content provided by server 110 (e.g. HTML content) to pass through after it is checked by script verifier 310 and before it is sent to a rendering engine used by browser 150. Script verifier 310 can also be implemented as a feature of browser 150 (e.g. built into the browser's own HTML parser and/or scripting engine 212) or an external add-on, using one of the extensibility mechanisms that may be associated with browser 150 (such as MIME filters). In general browser 150 may have other extensibility mechanisms to introduce such new functionality. Furthermore, for example, operation of script verifier 310 may be transparent both to scripting engine 212 and any rendering engine associated with browser 150. This is because, in an embodiment, actions carried out by script verifier 310 are done as data is read from network 102 and all permission tags are removed by script verifier 310 before the data is provided to a rendering engine associated with browser 150, to avoid rendering errors that may be caused due to the presence of permission tags within content.

In this way, content areas (e.g. websites) can limit, in advance, which types of executable content are allowed on web pages associated with the content area. Once these limits associated with execution of content are defined in advance at server 110, the any user generated executable content (e.g. blog posts) will not execute, because it may be blocked by script verifier 310 in browser 150. This helps in preventing XSS vulnerabilities.

4. Using Integrity Checks to Filter Executable Content

In this embodiment, server 110 embeds verify tags in content to be transmitted to client 140. In an embodiment, the first verify tag a random cryptographic key for each document or content area provided by server 110. The second verify tag, for example, is used for an integrity check over all the executable content (e.g. script) expected to be in the content area (e.g. web page), using the random key value defined in the first tag. Thus, server 110 generates a random value and embeds this random value at the beginning of a content area that is to be provided to client 140. Server 140 may then keep track of all executable sections being transmitted over network 102 (including references to external snippets using inline blocks and event-handlers) and maintains an integrity check over the stream of content sent over network 102 to client 140. In general, for example, one initial tag specifies the cryptographic key to use, parameters (such as canonicalization, MAC algorithm selected) and one or more subsequent tags provide integrity checks for a region of the document, where the integrity check is computed using the key and parameters referenced in the first tag.

Example 2, shown below, is an exemplary portion of script that is embedded within content (e.g. HTML content) of a web page transmitted by server 110 to client 140.

EXAMPLE 2

<verify key="random"> . . . (1)
<script src="good.js"> . . . (2)
<div><table> . . . </table> . . . (3)
<!-- other non-executable html --> . . . (4)
<img src=" . . . " onclick=" . . . " width=" . . . "> . . . (5)
<style> . . . </style> . . . (6)
<verify hash="abcd1234"> . . . (7)
<script src="bad.js"> . . . (8)
<script> . . . </script> . . . (10)
<a onclick="foo( )"> . . . </a> . . . (11)

In Example 2, the first verify tag in line (1) includes a key (e.g. a pseudo random key) chosen and embedded by server 110. The second verify tag in line (7) includes an integrity check (i.e. hash="abcd1234") for the preceding executable content appearing in lines (2) through (6), starting from the previous occurrence of the verify tag in line (1).

Figure 3B:
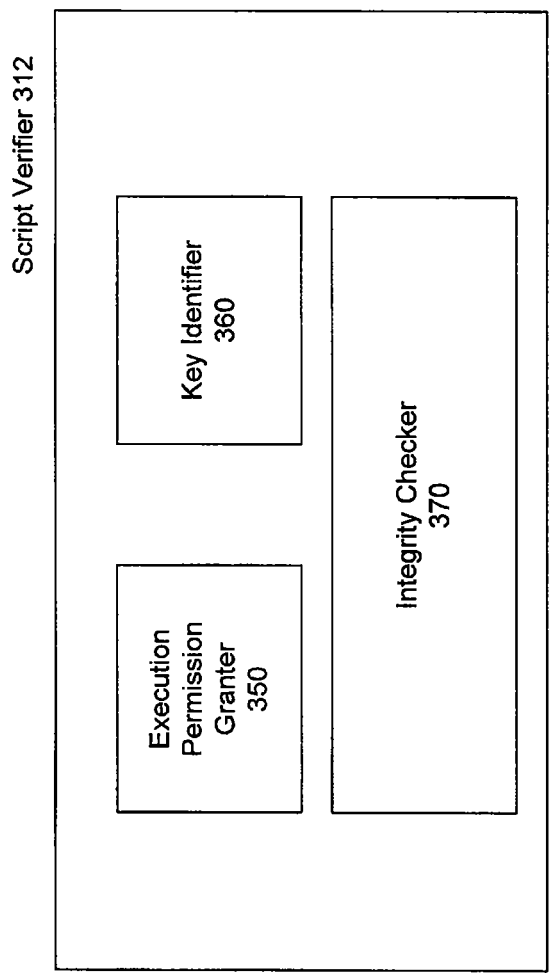
FIG. 3B is a diagram of a script verifier, according to another embodiment.

FIG. 3B illustrates script verifier 312, according to another embodiment of the present invention. Script verifier 312 includes execution permission granter 350, key identifier 360 and integrity checker 370.

In an embodiment, integrity checker 370 computes an integrity check using a Message Authentication Code (MAC) using a cryptographic key (e.g. the random value appearing in the verify tag in line (1) in Example 2) as the key and the executable content (e.g. the content in lines (1) though (6) in Example 2) as a message. Examples of MACs are known to those skilled in the art and include HMAC-SHA1 construction or any other authentication codes.

In an embodiment, the integrity check carried out by integrity checker 370 is a keyed-hash of all the executable content appearing between two verify tags. For example, integrity checker 370 computes a keyed-Hash Message Authentication Code or HMAC of all executable content in HTML provided by server 110, using a random key defined in a tag in the head section of the HTML document. Outputting this value in a new tag near the end of the document body validates any executable content (such as script, applets, ActiveX controls, extensions etc.) present on the page.

If an integrity check if determined to be correct by integrity checker 370, execution permission granter 350 in script verifier 312 would allow execution of the content between two verify tags (e.g. <verify key="random"> and <verify hash="abcd1234">). As an example, execution permission granter 350 would allow execution of executable content between lines (2) through (6). In Example 2, there is additional executable content on the page after the second verify tag (i.e. after line (7)). However, integrity checker 370 determines this content has no accompanying integrity check (i.e. no verify tag with a hash value). In this case the execution permission granter 350 would not grant permission to execute the executable content.

Figure 6:
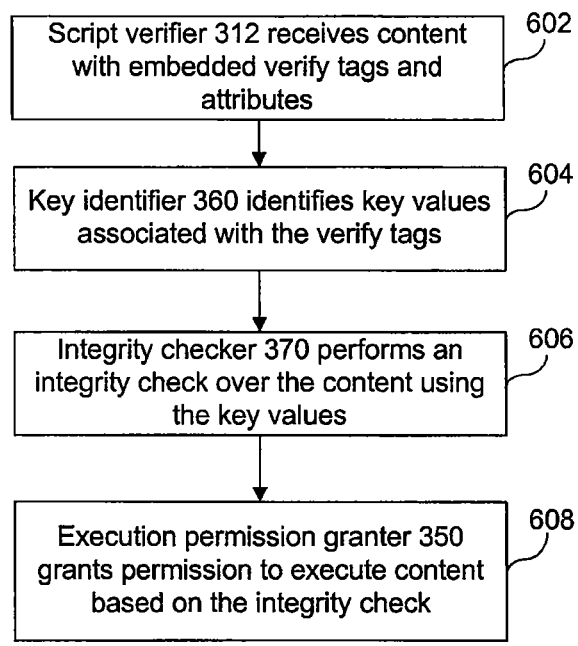
FIG. 6 is a flowchart illustrating an exemplary operation a script verifier, according to another embodiment.

FIG. 6 is a flowchart illustrating an exemplary operation of script verifier 312, according to an embodiment of the invention.

Script verifier 312 receives content that is embedded with verify tags and associated attributes from server 110 (step 602). Key identifier 360 identifies key values associated with the verify tags (step 604). Integrity checker 370 performs an integrity check over the content using the keys values (step 606). Execution permission granter 350 then grants permission to browser 150 execute content based on the integrity check (step 608).

As an example, not intended to limit the invention, for both permission tags and verify tags, server 110 includes a secret value near the beginning of the document, using new annotations (e.g. HTML tags or any other mark-up). This secret is then referenced by further annotations appearing later in the document.

In one case, for example, a secret value is reproduced verbatim to verify that permission tags are authentic (e.g. they must be accompanied by the same value for a permission tag to be considered valid)

In another case, the secret is used as an input to a cryptographic integrity check (e.g. used to compute the MAC which then gets placed in the annotation.)

No script or other executable content on a page can be executed until the integrity verification is completed by integrity checker 370. This means that browser 150 may need to hold off on passing any code to the scripting engine 212. As an example, this can be partially mitigated by allowing the script sections to be validated piecemeal, by having several integrity checks each covering different, non-overlapping sections of the document. In this way, as soon as executable content in one section is validated, it can be passed to be rendered by browser 150's rendering engine after it is parsed.

In addition to HTML tags, embodiments of the invention allow embedding integrity checks as comments in the source code of scripts and other executable content. As an example, server 110 may embed verify tags and associated keys in the source code of script "good.js" shown in Example 1. This allows executable content that is introduced at run time to be processed by script verifier 312 or script verifier 310.

In an embodiment, integrity checker 370 may increase robustness of an integrity check against non-substantial changes in the content being verified by "canonicalizing" the executable content prior to computing a MAC. As an example, canonicalizing may include replacing all strings and constants appearing within the executable content by a fixed value and ignoring comments in the executable content. In an embodiment a MAC algorithm used to compute the integrity checks as well as any canonicalization applied would be described as an attribute in the verify tag by server 110. As an example, canonicalization carried out by integrity checker 370 may help to reduce errors caused due to white-space, quotes, and other encoding of executable content. Errors caused due to white-space may be reduced, for example, by ignoring white-space while executable content is being processed by script verifier 312.

Furthermore, for example, operation of script verifier 312 may be transparent to both to scripting engine 212 and any rendering engine associated with browser 150. Additionally, embodiments of the invention, can be implemented in these entities. This is because, actions carried out by script verifier 312 are done as data is read from network 102 and all verify tags are removed by script verifier 312 before the data is provided to a rendering engine associated with browser 150, to avoid rendering errors that may be caused due to the presence of verify tags within content.

5. Exemplary Tags and Attributes Used for Integrity Checking

In an embodiment, verify tags used for facilitating integrity checks may be implemented as processing instructions or HTML comments within content by server 110.

As an example, a tag called "scriptvalidate" with additional attributes may be used by server 110. Server 110 can embed such a scriptvalidate tag anywhere in the document that is to be provided to client 140. For example, the scriptvalidate tag could appear either the HEAD or BODY section of the HTML page.

An exemplary scriptvalidate tag appears below:
<scriptvalidate key=" . . . " algorithm=" . . . " transform=" . . . " mac=" . . . "/>

In the above example, the "key" attribute identifies cryptographic key material to be used for an integrity check by integrity checker 370. In the above example scriptvalidate tag, both key and mac appear. However, for example, a tag would have either key or a mac attribute, or any combination that includes or may not include both attributes. As an example, it is a randomly generated value, independent for each request for content from client 140 to server 110. The "algorithm" attribute identifies the algorithm to be used for an integrity check by integrity checker 370. As an example, an HMAC-SHA1 algorithm may be used as a default value. The "transform" attribute identifies a transformation to be used on executable content. The "transformation" attribute may default to "nospace" indicating that white-space will not be included in an integrity check by integrity checker 370. The "mac" attribute identifies the value of the message authentication code (MAC) computed using the specified algorithm and key. In an embodiment, this value of "mac" is applied by server 110 to all executable content in the document between a current "scriptvalidate" tag and a last instance of the "scriptvalidate" tag.

In an embodiment, the "key" and "algorithm" attributes can be set on the first instance of the "scriptvalidate" tag embedded by server 110. The "mac" attribute may appear by itself, without the need of any of the other attributes. The "transform" attribute can be altered throughout the remainder of the document by including additional "scriptvalidate" tags. The transform attribute can be altered to accommodate any form of transformation of executable content other the white space attribute. In this way, different types of transforms can be done. In an embodiment, a key applies to all other instances of the integrity check appearing in the document, while both algorithm and transform can be independently specified for each section being verified (and if unspecified, for example, they may be the same as an initial one).

6. Dynamic or 'At Runtime' Integrity Checking

In an embodiment, script verifier 310 prevents a class of XSS also known as "DOM-based XSS attacks." As an example, in DOM based XSS attacks, executable code is injected into a web page after the web page has been downloaded by a different malicious web page (or frame or iframe) in the same or a different browser window. DOM-based XSS attacks, for example, may leverage a vulnerability in JavaScript code associated with cross-site issues.

As an example, consider an outer HTML frame with an 'iframe' that the user can s navigate, e.g. by clicking links within the iframe or by other means. (An iframe, for example, is an HTML element which makes it possible to embed a HTML document inside another HTML document.) Furthermore, consider that the JavaScript in the outer frame collects the URL of the iframe and renders it onto the outer frame, but does not correctly escape the URL, so that if the URL contains script fragments they could get executed in the context of the outer frame.

Thus, a hacker could perpetrate a DOM-based XSS attack on the outer frame by embedding malicious JavaScript in the URL of a site they control and tricking the user to navigate to that site. Furthermore, many of the effects (e.g. malicious effects) that JavaScript (or other executable content) can perpetrate occur through the Document Object Model (DOM) provided by browsers. This includes making network requests, which would be a fundamental need for most malicious sites, to send the data they have stolen back to the origin of such malicious sites.

In an embodiment, to prevent DOM-based XSS attacks, server 110 tags the page with integrity verifying HMACs that allow script verifier 310 to identify the signature of the JavaScript expected to run on the page In an embodiment, script verifier 312 modifies the browser 150's scripting engine 212 (which may be a JavaScript engine) so that every single time that JavaScript on a web page makes a call to one of the functions provided via the DOM, scripting engine 212 calculates the HMAC of the JavaScript or other executable content running within the context of the page, integrity checker 370 checks that it matches the expected HMAC embedded by server 110 in tagged content. In an alternative embodiment, a software solution could patch scripting engine 212 (e.g. JavaScript engine) to modify its behavior to perform the above steps. In another alternative embodiment, any software providing extensions to browser 150's DOM (such as Google Gears) could use this approach to protect all functions provided by the objects it adds to the browser 150's DOM.

7. Handling XSS Inside JavaScript Blocks

Consider for example the following 'title' line that appears within a <script> block of HTML code:

title: 'XSS defense in a web-browser'

Since the title is provided by user 150 but is in a <script> block, there is an potential XSS risk, and an additional canonicalization step may be performed by integrity checker 370 when hashing <script> blocks. In such a canonicalization step integrity checker 370 replaces any string literals by a constant. For example "title: 'XSS defense in a web-browser'" might be hashed to "title: '*'", instead of using the actual user provided title. This approach may avoid malicious input included in a script literal (e.g. title) that may change a hash and break the integrity check being carried out by integrity checker 370.

Consider another example, var title="XSS defense";

where <XSS defense> (without quotes) is the user input.

If this was not being sanitized/escaped properly, the user input "; alert(1);" would lead to an XSS vulnerability (starting with the leading double quote) and execute the JavaScript function alert( ), in a way not intended by the website itself.

Applying the integrity check to this string directly may not help, because the integrity check would cover var title=" "; alert(1)";

This may validate properly because this is also what client 140 sees. But canonicalization would mean that the integrity check sent by the server would correspond to "var title="*";," while the client sees, "var title="*"; alert(1)"; and that will not have same MAC.

8. Embedding Script Signatures:

This section describes exemplary syntax and methods of embedding different script signatures by server 110. As an example, not intended to limit the invention, script signatures may include a keyed hash or a public-key signature. Furthermore it is to be appreciated that, the invention is not limited by names of associated with tags.

8.1. Pre-Pending a Signature as an Attribute

In this embodiment, signatures are pre-pended by server 110 as an attribute to any element that contains executable code. This is illustrated in the example, shown below.

<script language=" . . . " signature=" . . . [sig covering code below] . . . ">
/* code goes here */
</script>
<img onfocus=" . . . " onload=" . . . " signature=" . . . [sig covering all event handlers] . . . ">

8.2. Embedding a Tag to Cover Executable Content

In this embodiment, a tag would cover a scope between its position in the document and the next tag appearing within that document. This is illustrated in the example shown below.

<!-- . . . HTML --> . . . (1)
<style> . . . </style> . . . (2)
<table onload=" . . . "> . . . </table> . . . (3)
<script id="foo"> . . . </script> . . . (4)
<verify signature=" . . . "/> . . . (5)
<script id="bar"> . . . </script> . . . (6)
<verify signature=" . . . "/> . . . (7)

In this case the first tag in line (5) includes a signature for the block in lines (1) thorough (5) and the signature tag appearing in line (7) includes the signature for lines (6) and (7).

As an example, the first signature tag would cover the style-sheet, the event handler attached to the table element as well as the inline script block labeled "foo", and the second signature tag would cover the snippet of script labelled "bar."

8.3. Appending Signatures as Comments

In this embodiment, server 110 can embed a signature as a comment into a script block as shown in the example below:

```
<script language=" . . . ">
/* code goes here */
/* signature=" . . . "*/
</script>
```

An advantage of the above approach is that the signature embedded by server 110 resides part of the script code and can be verified by script verifier 312 when client 140 is fetching the script content from server 110.

9. Example Computer Embodiment

Figure 7:
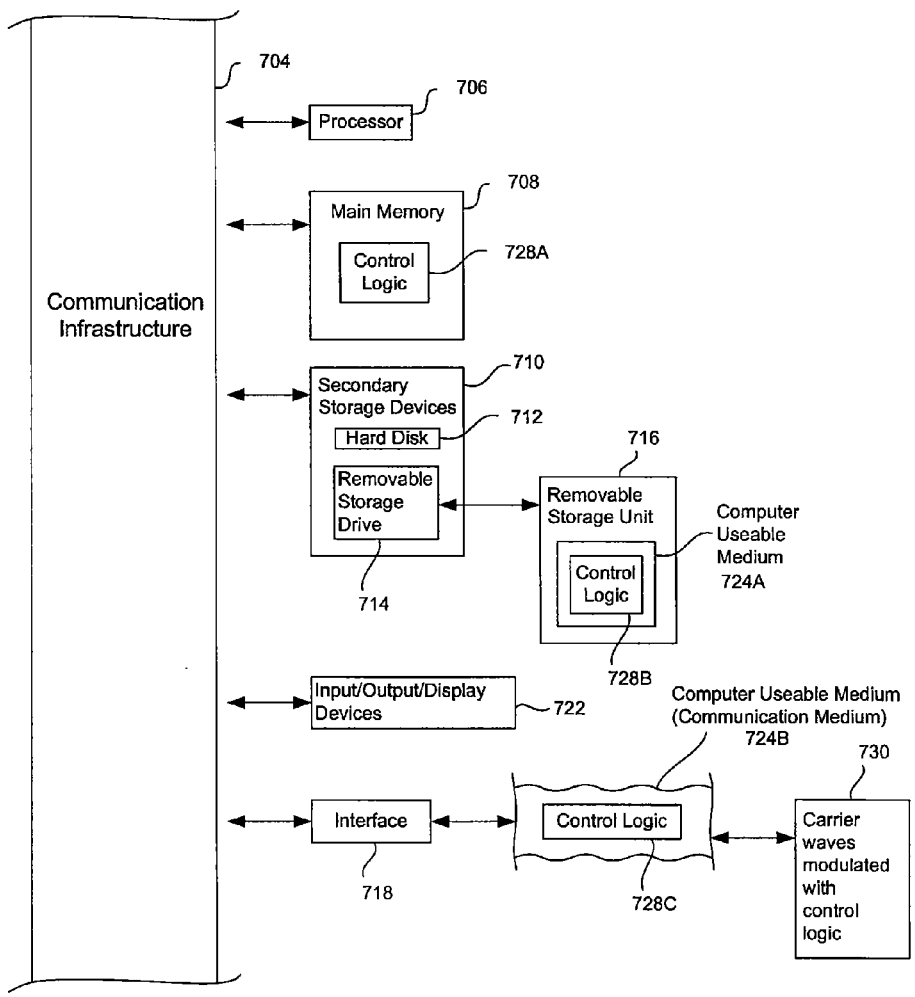
FIG. 7 illustrates an example computer useful for implementing components of embodiments.

In an embodiment of the present invention, the system and components of embodiments described herein are implemented using well known computers, such as example computer 702 shown in FIG. 7. For example, server 110 or client 140 can be implemented using computer(s) 702.

The computer 702 can be any commercially available and well known computer capable of performing the functions described herein, such as computers available from International Business Machines, Apple, Sun, HP, Dell, Compaq, Digital, Cray, etc.

The computer 702 includes one or more processors (also called central processing units, or CPUs), such as a processor 706. The processor 706 is connected to a communication infrastructure 704.

The computer 702 also includes a main or primary memory 708, such as random access memory (RAM). The primary memory 708 has stored therein control logic 727A (computer software), and data.

The computer 702 also includes one or more secondary storage devices 710. The secondary storage devices 710 include, for example, a hard disk drive 712 and/or a removable storage device or drive 714, as well as other types of storage devices, such as memory cards and memory sticks. The removable storage drive 714 represents a floppy disk drive, a magnetic tape drive, a compact disk drive, an optical storage device, tape backup, etc.

The removable storage drive 714 interacts with a removable storage unit 716. The removable storage unit 716 includes a computer useable or readable storage medium 724 having stored therein computer software 728B (control logic) and/or data. Removable storage unit 716 represents a floppy disk, magnetic tape, compact disk, DVD, optical storage disk, or any other computer data storage device. The removable storage drive 714 reads from and/or writes to the removable storage unit 716 in a well known manner.

The computer 702 also includes input/output/display devices 722, such as monitors, keyboards, pointing devices, etc.

The computer 702 further includes a communication or network interface 718. The network interface 718 enables the computer 702 to communicate with remote devices. For example, the network interface 718 allows the computer 702 to communicate over communication networks or mediums 724B (representing a form of a computer useable or readable medium), such as LANs, WANs, the Internet, etc. The network interface 718 may interface with remote sites or networks via wired or wireless connections.

Control logic 728C may be transmitted to and from the computer 702 via the communication medium 724B. More particularly, the computer 702 may receive and transmit carrier waves (electromagnetic signals) modulated with control logic 730 via the communication medium 724B.

Any apparatus or article of manufacture comprising a computer useable or readable medium having control logic (software) stored therein is referred to herein as a computer program product or program storage device. This includes, but is not limited to, the computer 702, the main memory 708, secondary storage devices 710, the removable storage unit 716 and the carrier waves modulated with control logic 730. Such computer program products, having control logic stored therein that, when executed by one or more data processing devices, cause such data processing devices to operate as described herein, represent embodiments of the invention.

Embodiments of the invention can work with software, hardware, and/or operating system implementations other than those described herein. Any software, hardware, and operating system implementations suitable for performing the functions described herein can be used. Embodiments of the invention are applicable to both a client and to a server or a combination of both.

The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer implemented method for processing permission tags embedded by a server to enable a client to identify executable or non-executable regions in content received by the client, comprising:

sending a request from the client to the server for the content, wherein the client sends the request to the server through a browser running at the client, wherein the browser is configured to include:
an opt-in setting that, when activated, causes the browser to run all executable content unless expressly forbidden by a permission tag, and
an opt-out setting that, when activated, causes the browser to run no executable content except that which is expressly permitted by a permission tag;

receiving the content embedded with one or more permission tags from the server, wherein each of the permission tags comprises a permission attribute that indicates whether any script following the tag is to be executed;

processing the content and the one or more permission tags; and granting permission to the browser to execute the content based on the one or more permission tags in the content.

2. The method of claim 1, wherein the processing includes parsing the content.

3. The method of claim 1, further comprising propagating the permission attributes of each tag into document object model (DOM) elements on a page served by the server for display by the browser so that the permission tags delineate sections of the page that allow execution of content and sections of the page that disallow execution of content.

4. The method of claim 1, further comprising checking one or more key values associated within the one or more permission tags.

5. The method of claim 4, further comprising disallowing execution of executable content if the key value is not verified.

6. A computer implemented method for processing verify tags embedded by a server to enable a client to identify executable or non-executable regions in content received by the client, comprising:

sending a request from the client to the server for the content, wherein the client sends the request to the server through a browser running at the client;

by the browser, receiving the content embedded with one or more verify tags with an associated key value from the server, wherein the browser is configured to include:
  an opt-in setting that, when activated, causes the browser to run all executable content unless expressly forbidden by a permission tag, and
  an opt-out setting that, when activated, causes the browser to run no executable content except that which is expressly permitted by a permission tag;

performing an integrity check of the content using the one or more verify tags; and granting permission to the browser to execute content based on the integrity check of the content.

7. The method of claim 6, wherein the granting comprises granting permission to the browser to execute a portion of the content appearing between the one or more verify tags.

8. The method of claim 6, further comprising identifying a key value within the one or more verify tags.

9. The method of claim 8, wherein the integrity check is performed using the key value and the content.

10. The method of claim 9, wherein the performing comprises computing a hash of executable content appearing between the one or more verify tags.

11. The method of claim 6, comprising canonicalizing the content prior to performing the integrity check.

12. The method of claim 11, wherein the canonicalizing step comprises replacing one or more strings and constants in the content by a fixed value.

13. A system for processing one or more permission tags with an associated key value embedded by a server to enable a client to identify executable or non-executable regions in content received by the client, comprising:

a computing device;

a browser, running on the computing device, to receive the content having the one or more permission tags from a server, wherein each of the permission tags comprises a permission attribute that indicates whether any executable content following the permission tag is to be executed, and wherein the browser is configured to include:
  an opt-in setting that, when activated, causes the browser to run all executable content unless expressly forbidden by a permission tag, and
  an opt-out setting that, when activated, causes the browser to run no executable content except that which is expressly permitted by a permission tag; and a script verifier, running on the computing device, to process the content and the permission tags to control execution of the executable content in the content.

14. The system of claim 13, wherein the script verifier further comprises:

a tag identifier to identify one or more permission tags in the content;

a key checker to check a value of one or more keys in the permission tags; and an execution permission granter configured to allow the browser to execute the executable content following a particular permission tag based on at least the tags and the keys only if the permission attribute of the particular permission tag indicates that the executable following the tag is to be executed and the value of the key of the particular permission tag corresponds to a previously-received key value.

15. The system of claim 13, wherein the script verifier further comprises:

a key identifier to identify one or more keys in verify tags;

an integrity checker to perform an integrity check on the content using the keys; and an execution permission granter to allow the browser to execute content based on at least the integrity check.

16. The system of claim 13, wherein the browser is configured based on an uniform resource locator (URL) or an identifier.

* * * * *